US009288827B2

(12) United States Patent
Shimada

(10) Patent No.: US 9,288,827 B2
(45) Date of Patent: Mar. 15, 2016

(54) WIRELESS COMMUNICATION DEVICES, COMMUNICATION SYSTEMS, METHODS, AND NON-TRANSITORY COMPUTER-READABLE MEDIA FOR SELECTIVELY ESTABLISHING DIFFERENT TYPES OF CONNECTIONS

(71) Applicant: Yusuke Shimada, Inazawa (JP)

(72) Inventor: Yusuke Shimada, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 317 days.

(21) Appl. No.: 13/764,176

(22) Filed: Feb. 11, 2013

(65) Prior Publication Data

US 2013/0260674 A1 Oct. 3, 2013

(30) Foreign Application Priority Data

Mar. 28, 2012 (JP) ................................. 2012-074328

(51) Int. Cl.
*H04W 76/00* (2009.01)
*H04W 76/02* (2009.01)
*H04W 8/00* (2009.01)
*H04W 84/20* (2009.01)

(52) U.S. Cl.
CPC .............. *H04W 76/02* (2013.01); *H04W 8/005* (2013.01); *H04W 84/20* (2013.01)

(58) Field of Classification Search
CPC ....................................................... H04W 84/20
USPC ....................................... 455/41.1, 41.2, 41.3
See application file for complete search history.

(56) References Cited

U.S. PATENT DOCUMENTS

| 2007/0297347 | A1* | 12/2007 | Ikeda | 370/254 |
|---|---|---|---|---|
| 2008/0025233 | A1* | 1/2008 | Otsuka | 370/254 |
| 2010/0272083 | A1* | 10/2010 | Itoh et al. | 370/338 |
| 2010/0291954 | A1* | 11/2010 | Nakajima | 455/507 |
| 2011/0188658 | A1* | 8/2011 | Sakai et al. | 380/278 |
| 2011/0189958 | A1* | 8/2011 | Goto et al. | 455/62 |
| 2012/0106514 | A1* | 5/2012 | Zheng et al. | 370/331 |
| 2012/0320414 | A1* | 12/2012 | Shibata | 358/1.15 |

OTHER PUBLICATIONS

Wi-Fi Alliance, "Wi-Fi Alliance Technical Committee P2P Task Group: Wi-Fi Peer-to-Peer (P2P) Technical Specification," Version 1.1, 2010 (concise explanation of relevance incorporated into specification at Para. [0003]).

* cited by examiner

*Primary Examiner* — Wen Huang
(74) *Attorney, Agent, or Firm* — Bakeer Botts L.L.P.

(57) ABSTRACT

Wireless communication devices operate selectively statuses including a master-station status and a slave-station status and include processors and memories storing computer-readable instructions. The instructions instruct such wireless communication devices to selectively perform a first process for establishing a first-type connection with a first device and a second process for establishing a second-type connection with a second device. The first process includes performing a response process, performing a determining process, and establishing the first-type connection with the first device, in which the wireless communication devices may operate as one of the master station and the slave station. The response process includes receiving a search signal from the first device and transmitting a response signal to the first device. The determining process includes assigning one of the master-station status and the slave-station status to such wireless communication devices. The second process includes establishing the second-type connection with the second device.

21 Claims, 9 Drawing Sheets

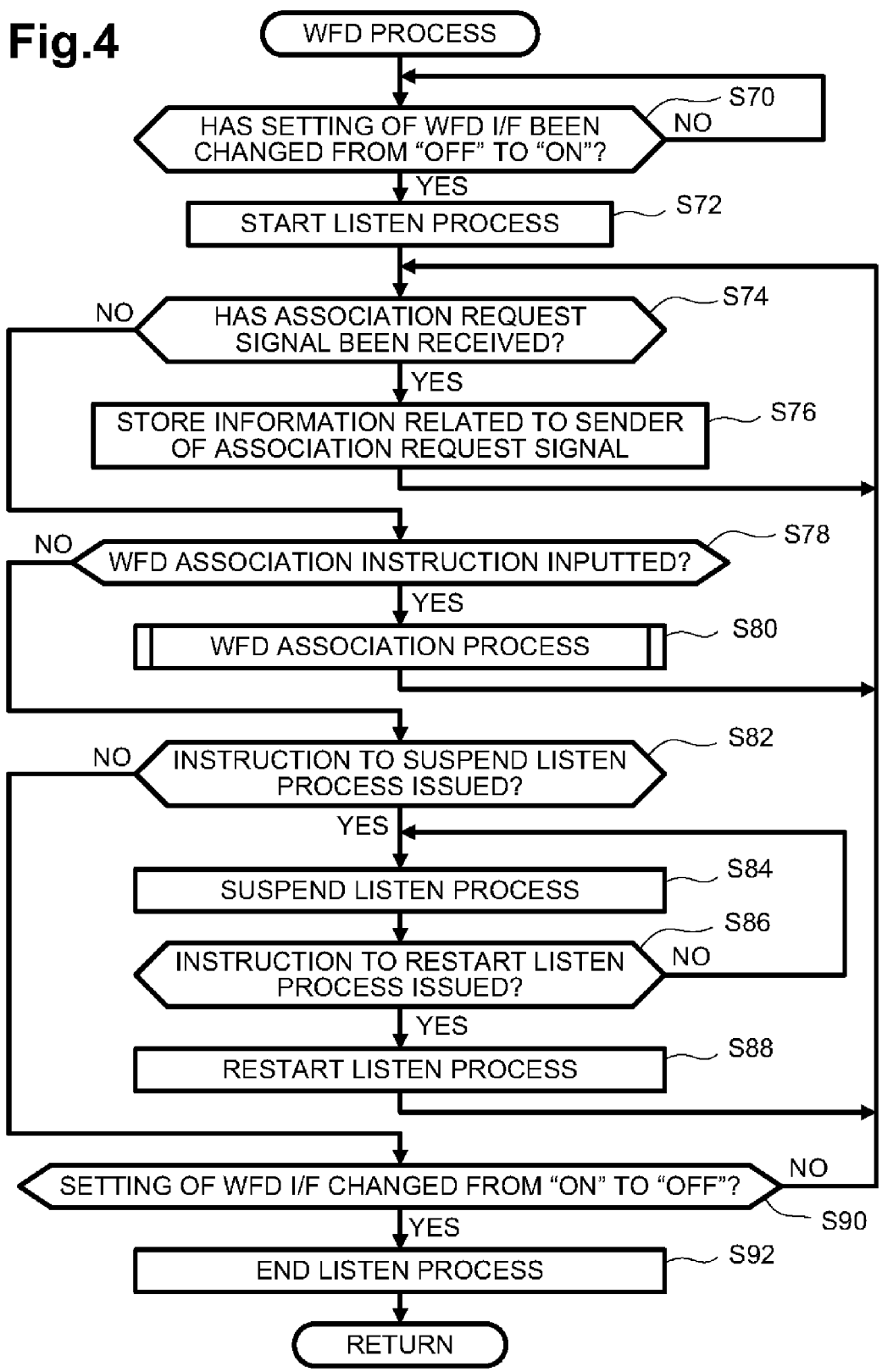

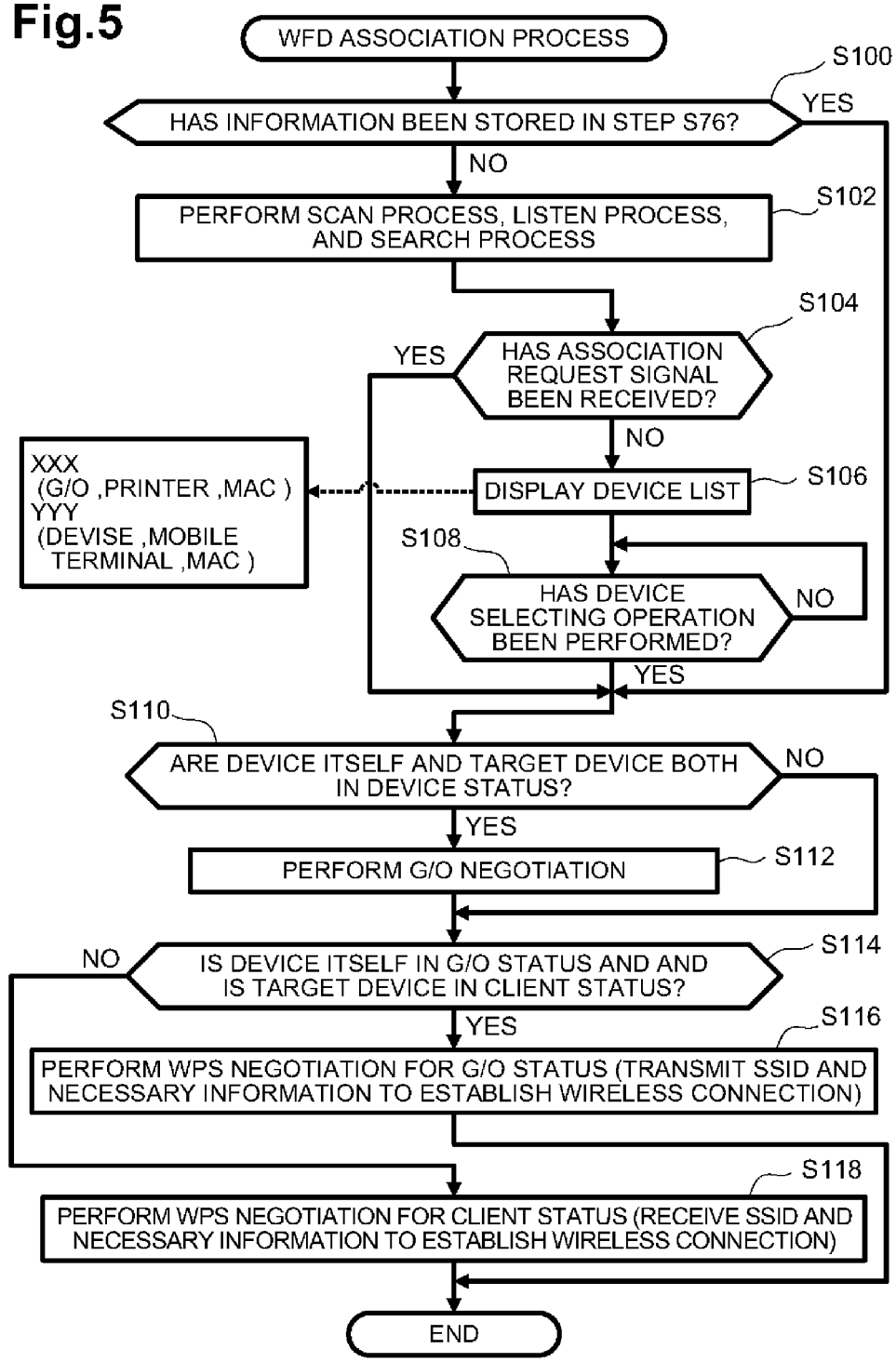

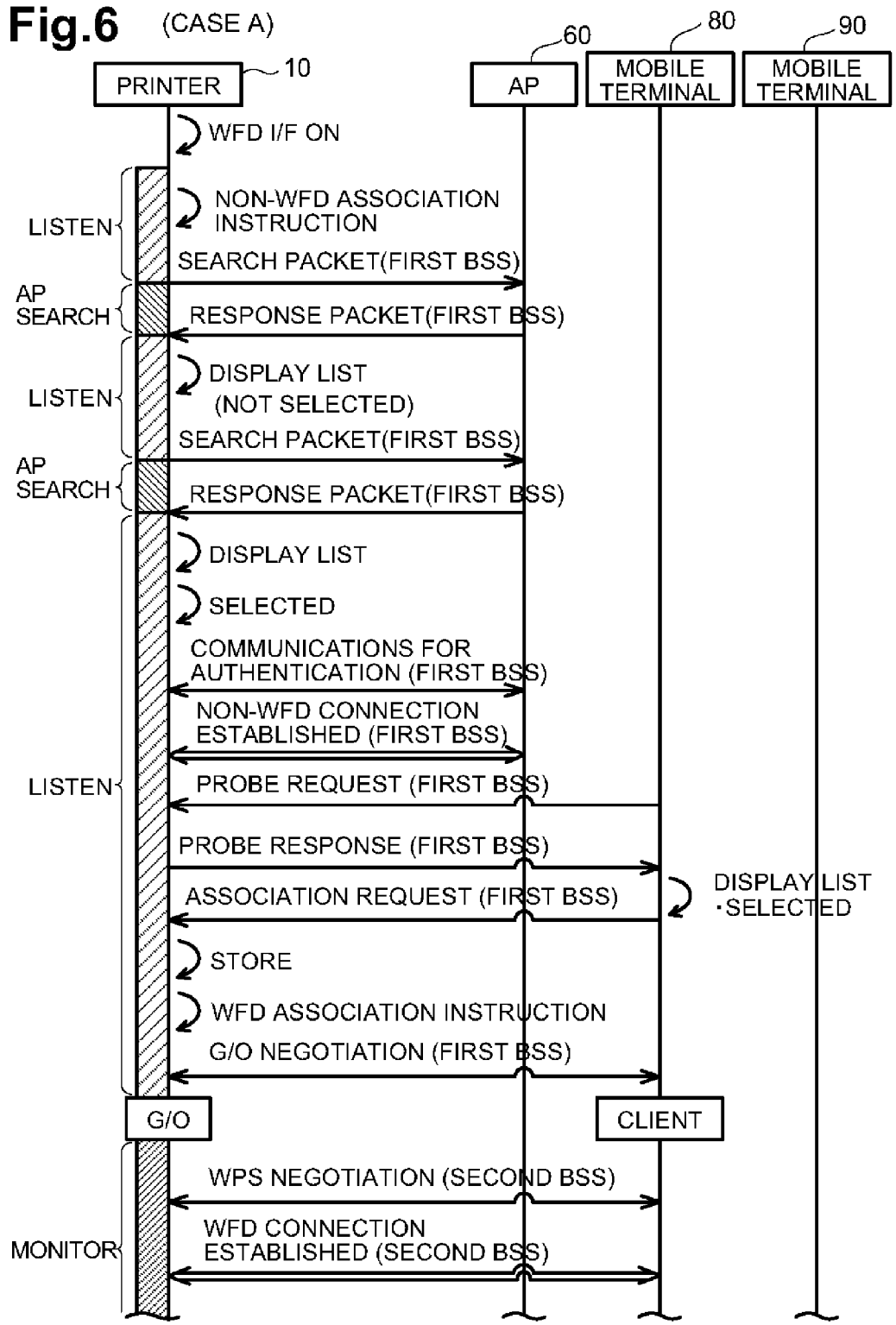

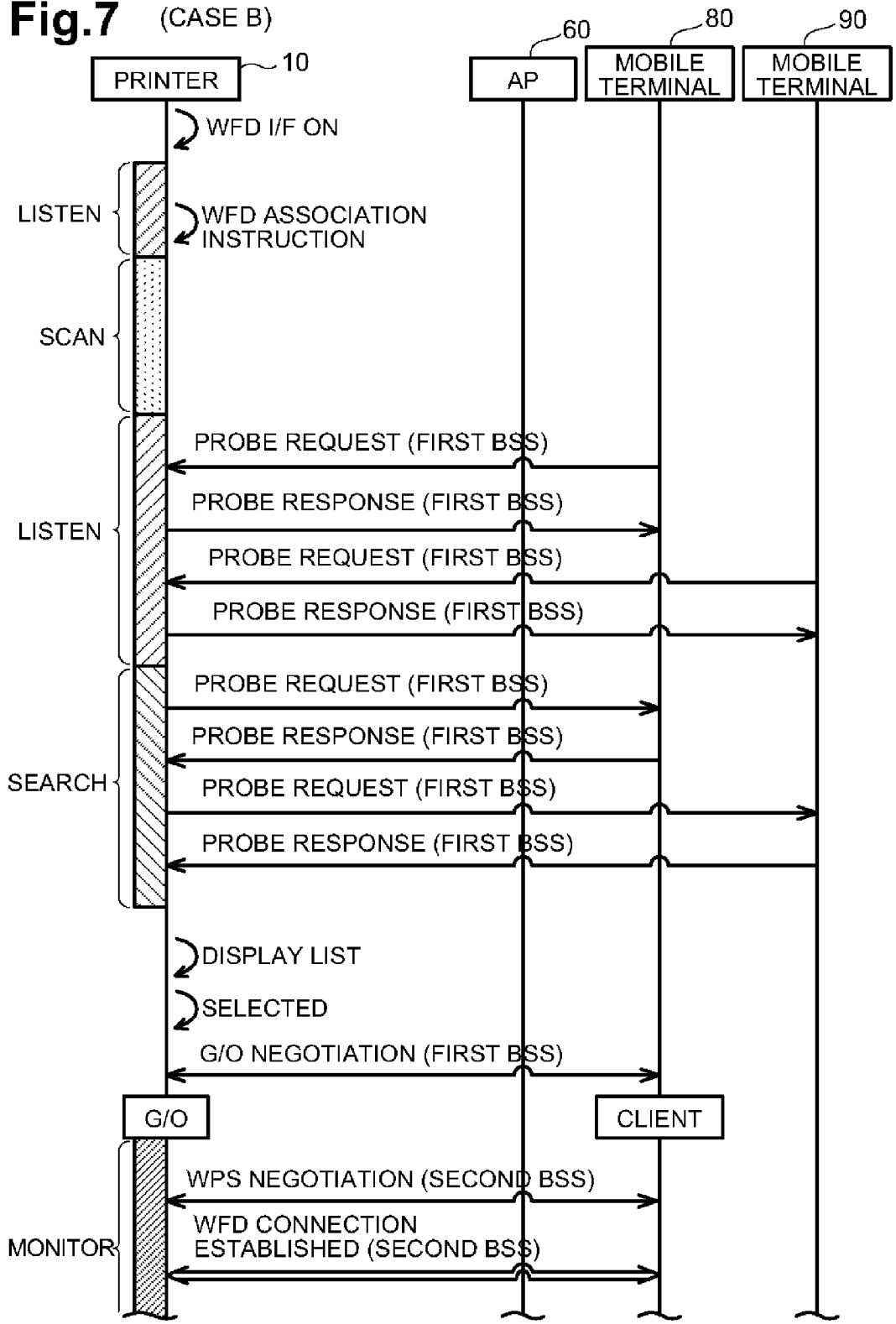

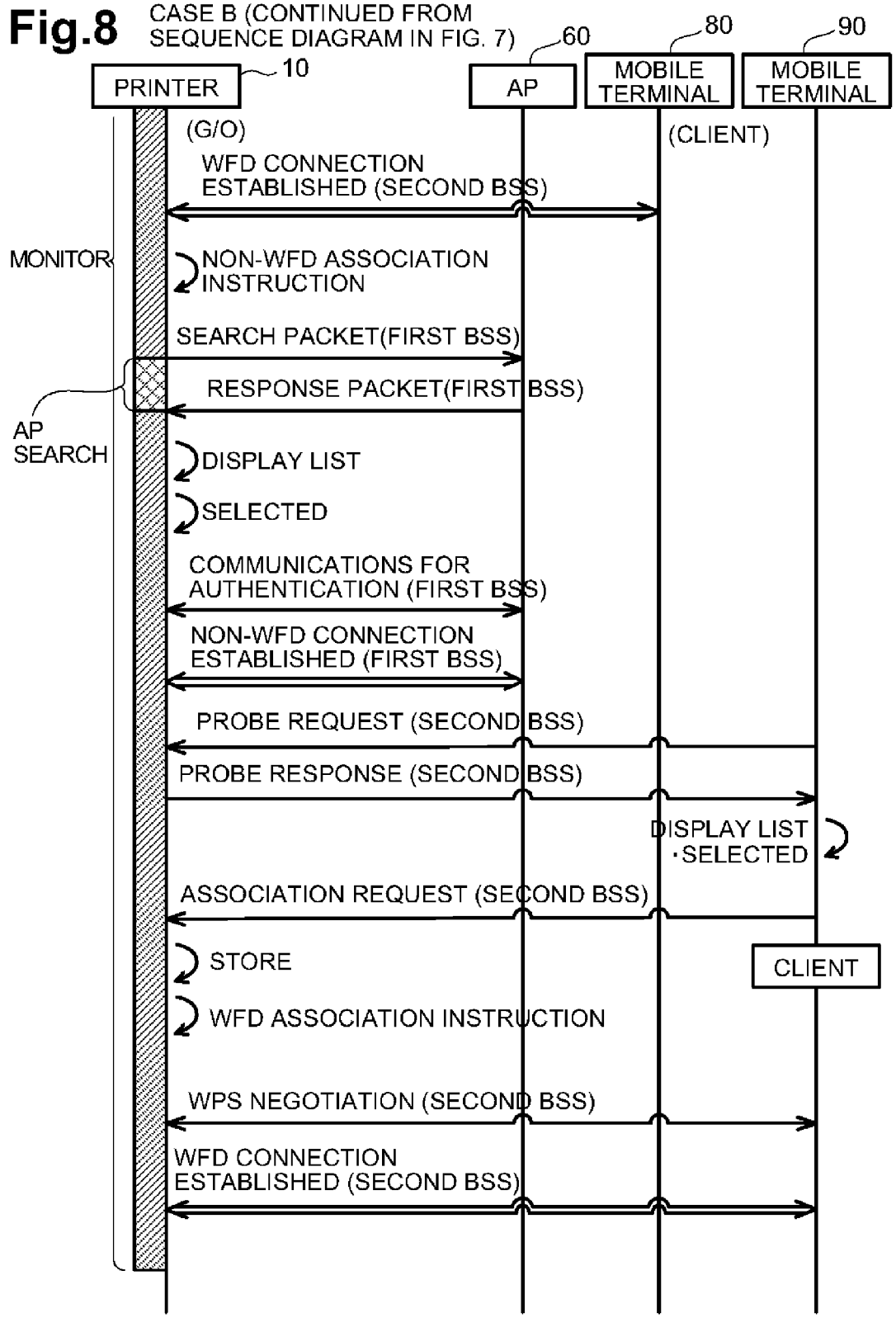

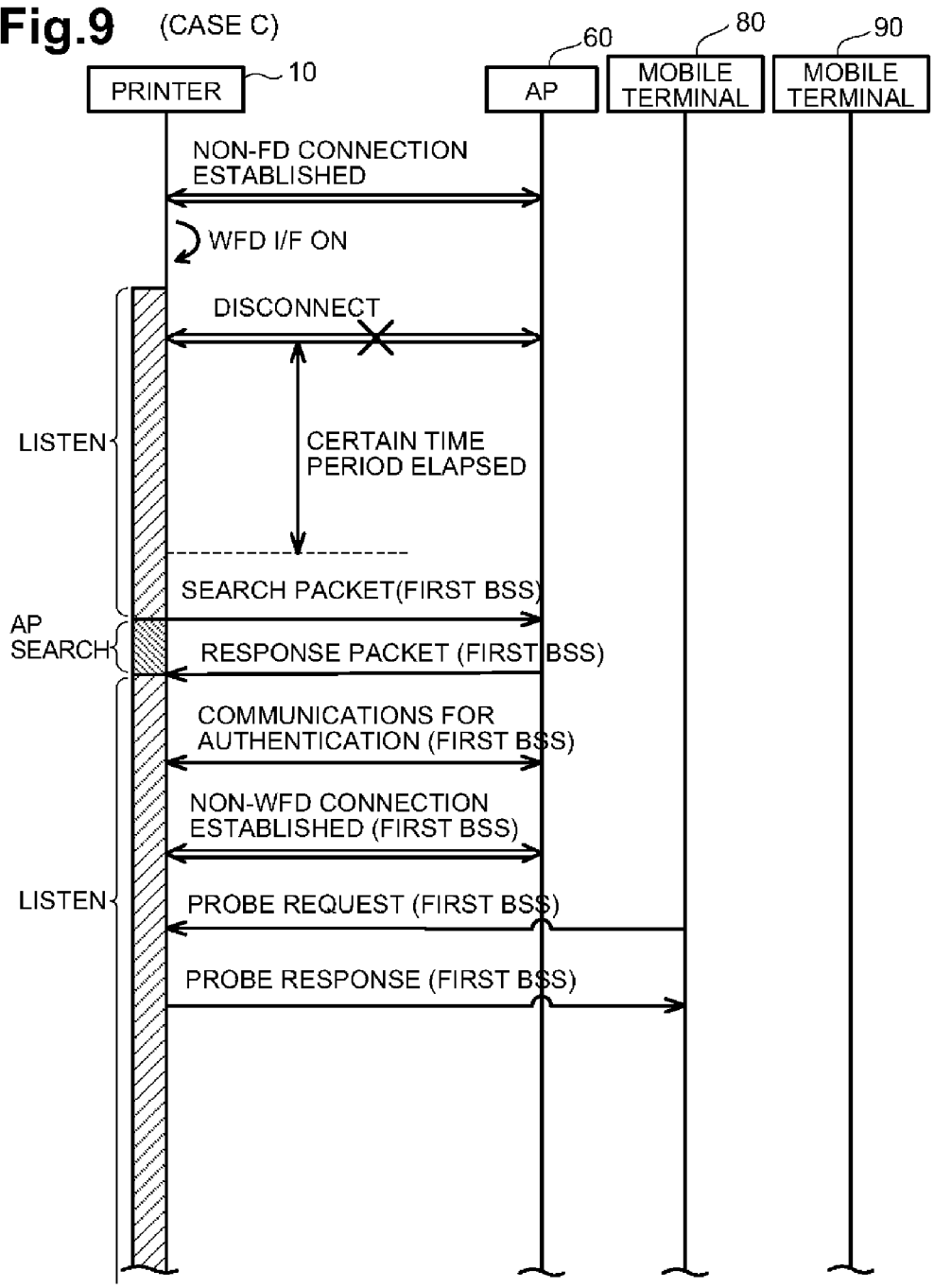

WIRELESS COMMUNICATION DEVICES, COMMUNICATION SYSTEMS, METHODS, AND NON-TRANSITORY COMPUTER-READABLE MEDIA FOR SELECTIVELY ESTABLISHING DIFFERENT TYPES OF CONNECTIONS

CROSS-REFERENCE TO RELATED APPLICATION

This application claims priority from Japanese Patent Application No. 2012-074328, filed on Mar. 28, 2012, the disclosure of which is incorporated herein by reference.

BACKGROUND OF THE INVENTION

1. Field of the Invention

The invention disclosed herein relates generally wireless communication and more specifically to wireless communication devices, communication systems, methods, and non-transitory computer-readable media for selectively establishing different types of connections.

2. Description of Related Art

The Wi-Fi Direct™ standard (hereinafter, referred to as "WFD") is specified in "Wi-Fi Peer-to-Peer (P2P) Technical Specification Version 1.1" created by the Wi-Fi Alliance in 20120 (Wi-Fi Direct™ is a certification mark owned by the Wi-Fi Alliance of Austin, Tex.). A network of devices that communicate therebetween in compliance with WFD is hereinafter referred to as a "WFD network," and a network of devices that communicate therebetween without complying with WFD is hereinafter referred to as a "non-WFD network," In WFD, a wireless communication device performs a listen process to monitor for and receive a probe request signal from an external device, and the wireless communication device subsequently transmits a probe response signal to the external device. Thus, the external device is able to find the wireless communication device. Subsequent to finding the wireless communication device, the external device transmits an association request signal to the wireless communication device. As a result, a wireless connection that complies with WFD is established between the external device and the wireless communication device.

SUMMARY OF THE INVENTION

Aspects of the disclosure may provide for a technique that may appropriately establish a connection between a wireless connection device and another device.

A wireless communication device disclosed herein may operate selectively in one of a plurality of statuses including a master-station status and a slave-station status. The wireless communication device may serve as a master station of a wireless network while operating in the master-station status. Conversely, the wireless communication device may serve as a slave station of the wireless network while operating in the slave-station status. Further, the wireless communication device may include a processor and a memory. The memory may store computer-readable instructions therein. The processor may execute the computer-readable instructions, which may instruct the wireless communication device to perform various processes in accordance therewith. In particular, the computer-readable instructions may instruct the wireless communication device to perform a first process for establishing a first-type connection with a first device in response to satisfaction of a first condition. The first process may include performing a response process, performing a determining process, and establishing the first-type connection with the first device. Specifically, the response process may include receiving from the first device a search signal and transmitting a response signal to the first device in response to the search signal. The determining process may be performed in response to performance of the response process and may include assigning one of the master-station status and the slave-station status to the wireless communication device. Moreover, in the first-type connection with the first device, the wireless communication device may operate as one of the master station and the slave station in accordance with the one of the master-station status and the slave-station status assigned to the wireless communication device in the determining process.

The computer-readable instructions also may instruct the wireless communication device to perform a second process for establishing a second-type connection with a second device in response to satisfaction of a second condition. Specifically, the second process may include establishing the second-type connection with the second device in response to detecting the second device. In particular configurations, the first process may be performed in response to the first condition being satisfied while the second process is being performed. Further, in particular configurations, the second process may be performed in response to the second condition being satisfied while the first process is being performed.

Control methods, computer-executable instructions, and a non-transitory computer-readable recording media storing such computer-executable instructions, each of which may realize the above-disclosed functions of such wireless communication devices also are disclosed herein.

For example, a computer-readable medium disclosed herein may store computer-readable instructions therein. When executed by the processor of a wireless communication device, the computer-readable instructions may instruct the wireless communication device to perform various processes in accordance therewith. Such processes may be similar to or the same as those performed by the wireless communication device described above. Further, the wireless communication device may be similar to the wireless communication device described above. In particular, the wireless communication device may operate selectively in one of a plurality of statuses including a master-station status and a slave-station status. Accordingly, the wireless communication device may serve as a master station of a wireless network while operating in the master-station status. Conversely, the wireless communication device may serve as a slave station of the wireless network while operating in the slave-station status.

Further, a communication system disclosed herein may include a first device, a second device, and a wireless communication device. The wireless communication device may be similar to or the same as the wireless communication device described above. In particular, the wireless communication device may operate selectively in one of a plurality of statuses including a master-station status and a slave-station status. The wireless communication device may serve as a master station of a wireless network while operating in the master-station status. Conversely, the wireless communication device may serve as a slave station of the wireless network while operating in the slave-station status. Further, the wireless communication device may include a processor and a memory. The memory may store computer-readable instructions therein. The processor may execute the computer-readable instructions, which may instruct the wireless communication device to perform various processes in accordance therewith. Such processes may be similar to or the same as those performed by the wireless communication devices described above.

Other objects, features, and advantages will be apparent to persons of ordinary skill in the art from the following detailed description of the disclosure and the accompanying drawings.

BRIEF DESCRIPTION ON OF THE DRAWINGS

For a more complete understanding of the present disclosure, needs satisfied thereby, and the objects, features, and advantages thereof, reference now is made to the following descriptions taken in connection with the accompanying drawings.

FIG. 4 is a flowchart showing a communication processes in a WFD network according to particular configurations.

FIG. 5 is a flowchart showing a process of associating devices in a WFD network according to particular configurations.

FIG. 6 is a diagram that shows a sequence of processes that may be performed by various devices in a Case A according to particular configurations.

FIG. 7 is a diagram that shows a sequence of processes that may be performed by various devices in a Case B according to particular configurations.

FIG. 8 is a continuation of the diagram in FIG. 7 that shows a sequence of further processes that may occur in the Case B according to particular configurations.

FIG. 9 is a diagram that shows a sequence of processes that may be performed by various devices in a Case C according to particular configurations.

DETAILED DESCRIPTION OF EMBODIMENTS OF THE INVENTION

Figure 1:
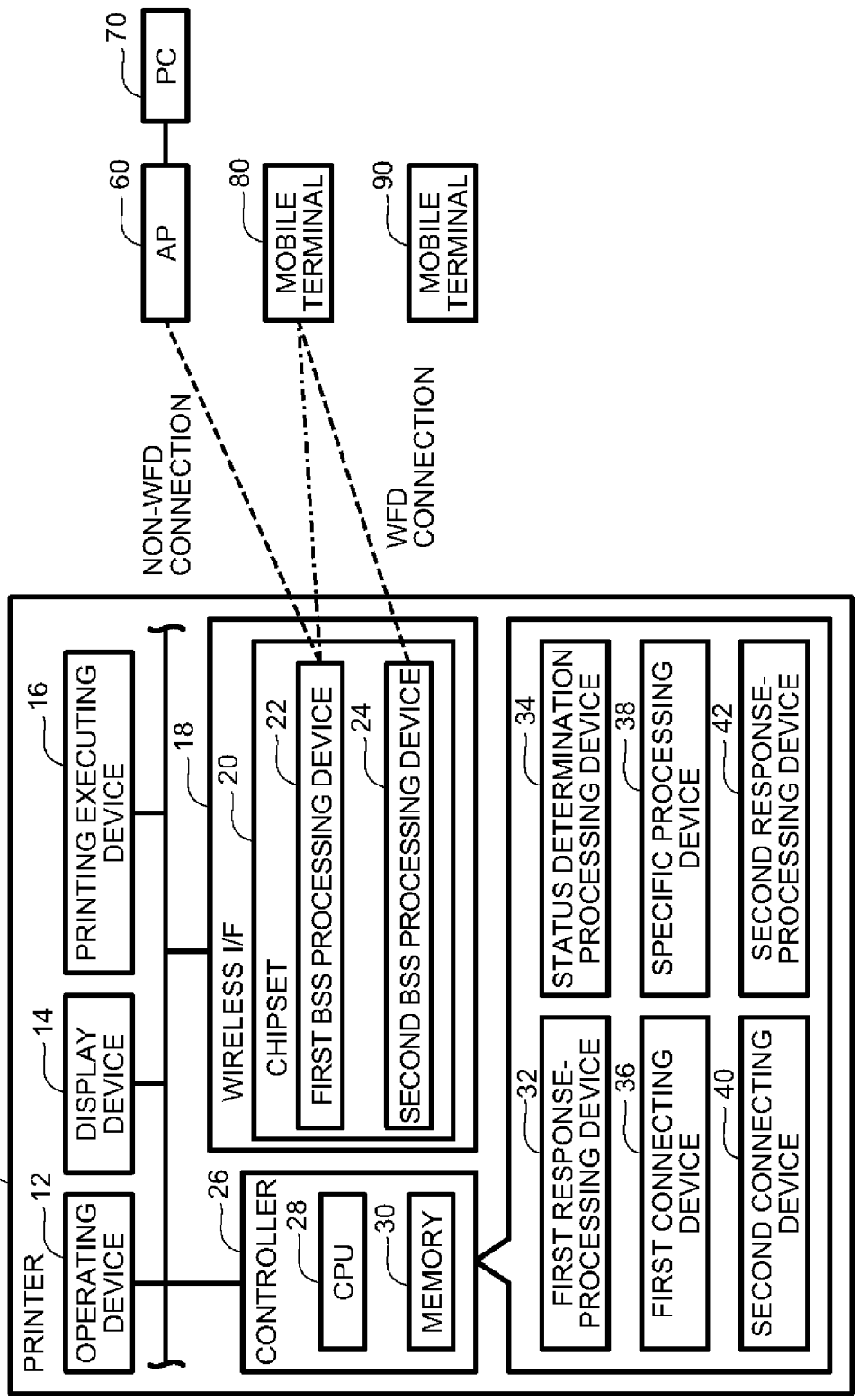
FIG. 1 is a block diagram showing particular configurations of a communication system.

As depicted in FIG. 1, a communication system 2 may comprise a printer 10, an access point ("AP") 60, a personal computer ("PC") 70, and mobile terminals 80 and 90. The printer 10 may be a peripheral device for the PC 70 and the mobile terminal 80, for example.

The mobile terminals 80 and 90 may be portable terminals that may comprise, for example, one or more of a smartphone, a personal digital assistant ("PDA") terminal, a notebook PC, and a tablet PC. The printer 10 and the mobile terminals 80 and 90 may perform a wireless communication function that complies with WFD (described below). ,"A connection that complies with WFD may be referred to as a "WFD connection." The printer 10 may establish a WFD connection with one or more mobile terminals 80 and 90, and, thus, a WFD network may be configured. Accordingly, wireless communication, for example, transmission or reception of communication target data (e.g., print data), may become available between the printer 10 and one of the mobile terminals 80 and 90.

The printer 10 may perform a common wireless communication function (e.g., wireless communication that complies with the 802.11 standard defined by the Institute of Electrical and Electronics Engineers ("IEEE")), as well as a wireless communication function that complies with WFD. Hereinafter, the common wireless communication may be referred to as "non-WFD wireless communication." The printer 10 may establish a wireless connection with the AP 60 (hereinafter, referred to as a "non-WFD connection") by performing non-WFD wireless communication. Thus, a non-WFD network may be configured by establishing a non-WFD connection between the printer 10 and the AP 60. The PC 70 may establish a non-WFD connection with the AP 60. The PC 70 may be configured such that the PC 70 may not perform the wireless communication function that complies with WFD. Nevertheless, in some configurations, for example, the PC 70 may perform the wireless communication function that complies with WFD. With the configuration of the non-WFD network, wireless communication, for example, transmission or reception of communication target data (e.g., print data), may become available between the printer 10 and the PC 70 via the AP 60.

In particular configurations, the printer 10, the AP 60, and the PC 70 may be disposed in a particular location. Accordingly, a non-WFD network comprising the printer 10, the AP 60, and the PC 70 may be established at the particular location. Therefore, an input (e.g., via a staff member of a company at the particular location) through the PC 70 may cause the printer 10 to perform printing via the AP 60. Further, for example, an input (e.g., via a visitor to the company at the particular location) through the mobile terminal 80 may temporarily establish a WFD connection between the mobile terminal 80 and the printer 10. Accordingly, the mobile terminal 80 may be used to temporarily configure a WFD network comprising the mobile terminal 80 and the printer 10. Thus, the mobile terminal 80 may allow the printer 10 to perform printing without the need for the AP 60. As described above, the non-WFD network may be an enduring network established for long-term use and the WFD network may be a temporary network established for temporary use.

The printer 10 may comprise an operating device 12, a display device 14, a printing executing device 16, a wireless interface ("I/F") 18, and a controller 26, each of which may be connected with a bus (reference numeral is omitted).

The operating device 12 may comprise a plurality of keys, buttons, or combinations thereof. The printer 10 may receive various instructions through operation of the operating device 12. For example, an operation for switching between "on" and "off,"" states of a setting indicating whether to perform wireless communication that complies with WFD (hereinafter, referred to as a "WFD I/F setting") may be made by operating operating device 12. Further, an operation for switching between "on" and "off,"" states of a setting of an autonomous group owner ("G/O") mode (described below) may be made by operating the operating device 12. The display device 14 may be a display configured to display various information thereon. The printing executing device 16 may comprise a printing mechanism comprising one or more of, for example, an inkjet type and an electrophotographic type. The printing executing device 16 may perform printing in accordance with an instruction from the controller 26.

The wireless interface 18 may allow the printer 10 to perform wireless communication with another device. While the wireless interface 18 may, for example, comprise a single interface physically, the wireless interface 18 may comprise a chipset 20 that may comprise a first basic service set ("BSS") processing device 22 and a second BSS processing device 24 (each described below).

The controller 26 may comprise a central processing unit ("CPU") 28 and a memory 30. The memory 30 may be configured to store computer-readable instructions therein. The CPU 28 may perform various processes in accordance with the computer-readable instructions stored in the memory 30. The memory 30 may comprise one or more of a read-only memory ("ROM"), a random-access memory ("RAM"), and a hard disk, for example. The memory 30 may be configured to store one or more of data acquired and data generated during the performance of processing by the CPU 28, as well as the computer-readable instructions to be or being executed the CPU 28. Each function of a first response-processing device 32, a status determination processing device 34, a first connecting device 36, a specific processing device 38, a second connecting device 40, and a second response-processing device 42 may be implemented by the CPU 28 in accordance with the computer-readable instructions.

The first BSS processing device 22 and the second BSS processing device 24 may be controlled by the controller 26 and may be configured to perform a communication process related to a wireless network (e.g., various signal communications for wireless network configuration and data communications for transmitting or receiving target data by using a wireless network). The controller 26 may be configured to perform the wireless-network-related communication process using one or both of the two BSS processing devices 22 and 24.

The controller 26 may use the first BSS processing device 22 while the printer 10 is turned on. The controller 26 may perform processes related to a non-WFD network (e.g., an AP search process, a non-WFD connection establishing process, and a data communication process for one or more of transmitting and receiving target data using a non-WFD network, which are described below) via the first BSS processing device 22. Further, the controller 26 may perform communications related to an establishment of a WFD connection via the first BSS processing device 22. More specifically, the controller 26 may perform, via the first BSS processing device 22, processes (e.g., a listen process and a G/O negotiation, which are described below) occurring before a status of the printer 10 is determined as, for example, one of a group owner status (hereinafter, referred to as a "G/O status") and a client status.

The controller 26 may perform each process related to a WFD network (e.g., a WPS negotiation, a monitor process, and a data communication process for transmitting or receiving target data by using a non-WFD network, which are described below) via the second BSS processing device 24 subsequent to the status of the printer 10 is determined as, for example, one of the G/O status and the client status in a WFD network.

The controller 26 may be configured to simultaneously perform two or more processes of the above-described processes performed via the first BSS processing device 22. Nevertheless, as an exception, in certain configurations, the controller 26 (e.g., via the first response-processing device 32 and the specific processing device 38) may be configured such that it may not simultaneously perform the listen process for establishing a WFD network and the AP search process for establishing a non-WFD connection via the first BSS processing device 22.

The controller 26 may be configured to perform a process via the first BSS processing device 22 simultaneously with a process performed via the second BSS processing device 24. For example, the controller 26 may perform wireless communication via the first BSS processing device 22 for one or more of transmitting and receiving target data using an established non-WFD network while performing wireless communication via the second BSS processing device 24 for one or more of transmitting and receiving target data using an established WFD network. Accordingly, the controller 26 may perform the wireless communication function that complies with WFD and the common wireless communication function simultaneously using the single wireless interface 18. With this configuration, the controller 26 may achieve a state in which both of the WFD connection and the non-WFD connection are established simultaneously.

In particular configurations, for example, each process performed between the printer 10 and another device (e.g., one or more of the AP 60, the PC 70, and the mobile terminal 80 and 90) may be performed via the first BSS processing device 22 unless it is explicitly specified herein that a process is performed via the second BSS processing device 24. Nevertheless, in other configurations, either of the BSS processing devices 22 and 24 may perform processes described herein.

As described above, each of the printer 10 and the mobile terminal 80 may perform the wireless communication function that complies with WFD. Hereinafter, a device that may support the wireless communication function that complies with WFD may be referred to as a "WFD-enabled device," and a device that may not support the wireless communication function that complies with WFD may be referred to as a "non-WFD-enabled device." The WFD defines three statuses of a WFD-enabled device: a G/O status, a client status, and a device status. The WFD-enabled device may be configured to operate selectively in one or more of the three statuses.

A single WFD network may be configured by a device having the G/O status (hereinafter, also referred to as a "G/O-status device") and one or more devices having the client status (hereinafter, also referred to as a "client-status device"). In a single WFD network, one or more client-status devices may be present while only one G/O-status device (e.g., a device having G/O status for that single WFD network) may be present. The G/O-status device may be configured to manage the one or more client-status devices. More specifically, the G/O-status device may be configured to generate a management list that may describe identifying information (e.g., a media access control ("MAC") address) of each of the one or more client-status devices. When a new client-status device participates in the WFD network, the G/O-status device may add identifying information of the new client-status device on the management list. When one of the one or more client-status devices leaves the WFD network, the G/O-status device may erase the identifying information of the departing or departed client-status device.

The G/O-status device may be configured to perform wireless communication of communication target data (e.g., data, such as print data or other data, comprising information in the network layer of the Open Systems Interconnection ("OSI") reference model created by the International Organization for Standardization ("ISO")) with one of the one or more devices that may be listed in the management list, such as one of the one or more client-status devices. The G/O-status device may be configured to not perform wireless communication of the communication target data with a client-status device that is not listed in the management list. The G/O-status device, however, may be configured to perform wireless communication of data for participating in the WFD network (e.g., data that does not comprise information in the network layer, such as data in the physical layer, which may comprise, for example, a probe request signal or a probe response signal) with the unlisted client-status device. For example, the printer 10 having the G/O status may receive print data via wireless communication from the mobile terminal 80 (e.g., the mobile terminal 80 having the client status) listed in the management list, but the printer 10 may not receive print data via wireless communication from a device not listed in the management list.

The G/O-status device may be configured to serve as a relay station configured to relay wireless communication between a plurality of the client-status devices that may transmit communication target data (e.g., print data) therebetween. For example, when the mobile terminal 80 having the client status transmits print data via wireless communication to another printer having the client status, the mobile terminal 80 may transmit the print data via wireless communication to the printer 10 having the G/O status. Consequently, the printer 10 may receive the print data via wireless communication from the mobile terminal 80 and may transmit the received print data via wireless communication to the other printer. For example, the G/O-status device may be configured to function as the AP in the wireless network.

A WFD-enabled device that may be absent from the WFD network (e.g., a WFD-enabled device not listed in the management list) may be a device having the device status (hereinafter, also referred to as a "device-status device"). The device-status device may be configured to perform wireless communication of the data for participating the WFD network with the G/O-status device (e.g., data comprising information in a physical layer of one or more of a probe request signal or a probe response signal), but the device-status device might not perform wireless communication of communication target data (e.g., print data) with the G/O-status device via the WFD network.

Figure 2:
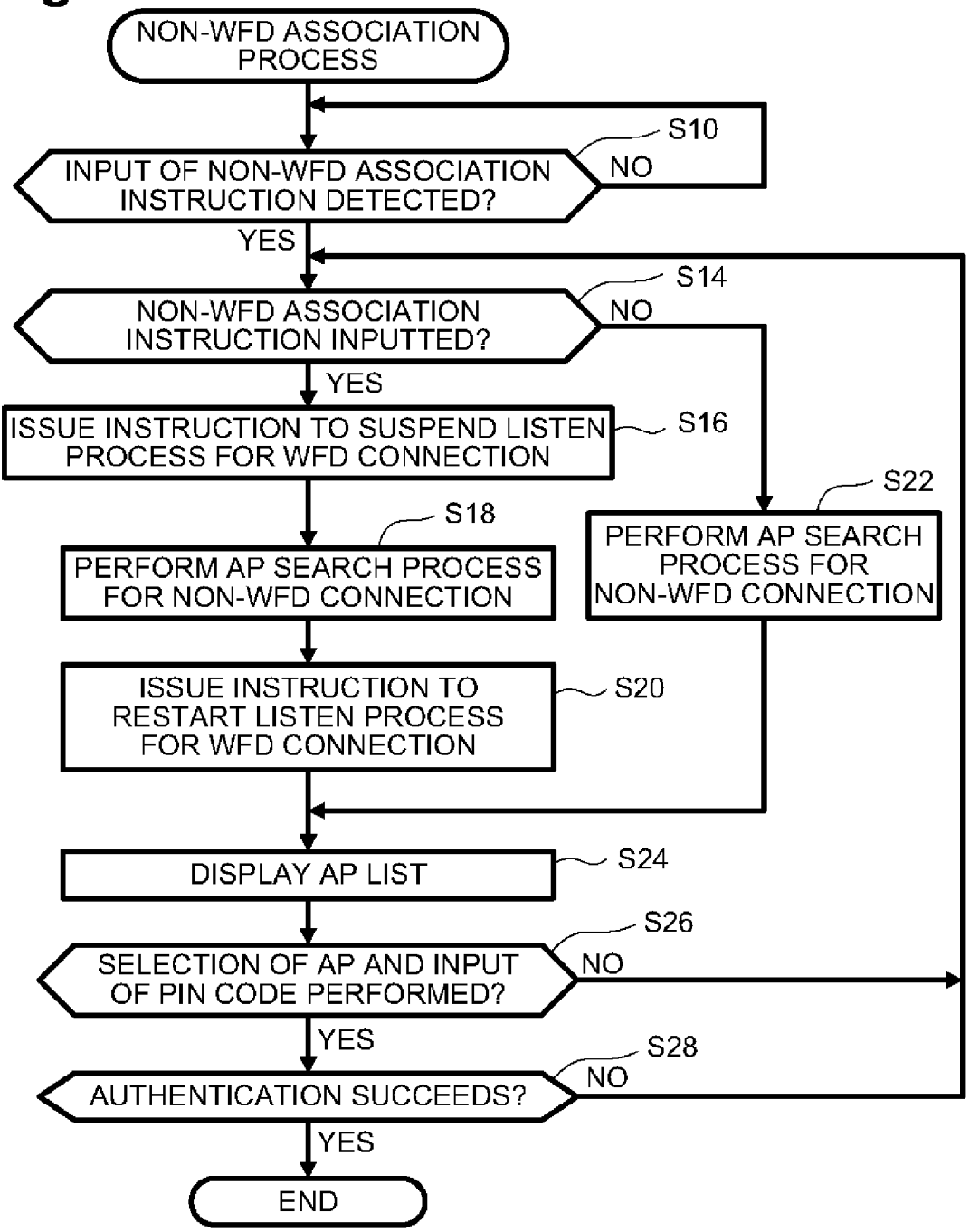
FIG. 2 is a flowchart showing a process of associating devices in a non-WFD network according to particular configurations.

Processes performed by the printer 10 now are described. With reference to FIG. 2, a non-WFD association process performed by the printer 10 now is described.

In response to turning on the printer 10, in step S10, the specific processing device 38 may monitor for an input of a non-WFD association instruction. For example, when a non-WFD connection is to be established between the printer 10 and the AP 60, a predetermined non-WFD association instruction may be input through the operating device 12 by operating the operating device 12. When the specific processing device 38 detects the input of the predetermined non-WFD association instruction, the specific processing device 38 may make a positive determination (YES) in step S10 and the routine may move to step S14.

In step S14, the specific processing device 38 may determine whether the listen process for establishing a WFD network is being performed. In the listen process, when the printer receives a probe request signal via wireless communication from an external device, the first response-processing device 32 may transmit a probe response signal via wireless communication to the external device. If the first response-processing device 32 is performing the listen process, the specific processing device 38 may make a positive determination (YES) in step S14, and the routine may move to step S16. If the first response-processing device 32 is not performing the listen process, the specific processing device 38 may make a negative determination (NO) in step S14, and the routine may move to step S22.

Example scenarios in which the first response-processing device 32 may not be performing the listen process (NO in step S14) are described below. For example, when the WFD I/F setting in the printer 10 is in an "off" state, the first response-processing device 32 may not perform the listen process. Further, when a WFD connection has been established between the printer 10 and another device (e.g., the mobile terminal 80), the first response-processing device 32 may not perform the listen process. Moreover, when it is determined that the printer 10 is to operate in one of the G/O status and the client status, the first response-processing device 32 may not perform the listen process. In addition, determining that the printer 10 is operating with the G/O status may comprise one or more of making a determination that the printer 10 is operating with the G/O status in a G/O negotiation performed in step S112 of FIG. 5 and making a determination that the printer 10 is operating with the G/O status in response to the setting of the autonomous G/O mode being changed from "off" to "on."

In step S16, the specific processing device 38 may instruct the first response-processing device 32 to suspend the listen process. In response, the first response-processing device 32 may suspend the listen process (e.g., YES in step S82 followed by step S84 of FIG. 4). Accordingly, when the specific processing device 38 instructs the first response-processing device 32 to suspend the listen process, the first response-processing device 32 may not transmit a probe response signal via wireless communication, even when the first response-processing device 32 receives a probe request signal via wireless communication from another device. Consequently, the listen process performed via the first BSS processing device 22 may be suspended.

Subsequently, in step S18, the specific processing device 38 may perform the AP search process for establishing a non-WFD network. The AP search process comprises searching for whether one or more APs that may be accessible by the printer 10 (e.g., determining whether such APs are present). More specifically, in step S18, the specific processing device 38 may sequentially transmit a predetermined search packet via wireless communication to each AP by using thirteen wireless channels (e.g., channels 1-13).

For example, when an AP (hereinafter, referred to as a "specific AP") that is accessible by the printer 10 is present, it may be predetermined that the specific AP uses one of the channels 1-13. The specific AP may comprise a G/O-status device for establishing a WFD network. Upon receipt of the search packet from the printer 10 via wireless communication, the specific AP may transmit a response packet via wireless communication to the printer 10. The response packet may comprise a service set identifier ("SSID") of the specific AP. Thus, the specific processing device 38 may find the specific AP.

As described above, when the non-WFD association instruction to start the AP search process is input during execution of the listen process (e.g., YES in step S14), first response-processing device 32 may suspend the listen process, and the specific processing device 38 may perform the AP search process without the listen process. If the controller 26 (e.g., the first response-processing device 32 and the specific processing device 38) of the printer 10 attempts to perform the listen process and the AP search process simultaneously via the first BSS processing device 22, the attempt may fail because the controller 26 may not perform the listen process and the AP search process simultaneously via the first BSS processing device 22. The specific processing device 38 may sequentially transmit the predetermined search packet via wireless communication to each AP by using the channels 1-13 in the AP search process. In response to this, the first response-processing device 32 may receive a probe request signal through one (e.g., the channel 6) of the channels 1-13 in the listen process. Although in certain configurations one of the channels 1-13 may used in the listen process, all or fewer of the channels 1-13 may be used one subsequent to another in the AP search process. Nevertheless, the first BSS processing device 22 may be configured to perform communication using a single channel in some configurations. Therefore, in such configurations, the controller 26 may not be able to perform communication using two different channels simultaneously. Accordingly, the controller 26 may be configured such that it may not simultaneously perform a listen process and an AP search process, which use different channels, via the first BSS processing device 22. As described above, when the non-WFD association instruction to start the AP search process is input during execution of the listen process (e.g., YES in step S14), first response-processing device 32 may suspend the listen process, and the specific processing device 38 may perform the AP search process without performing the listen process. Accordingly, the printer 10 may perform the AP search process appropriately and find the specific AP properly.

Subsequent to the AP search process in step S18, in step S20, the specific processing device 38 may instruct the first response-processing device 32 to restart the listen process that was been suspended in step S16. In response to this, the first response-processing device 32 may restart the listen process (e.g., YES in step S86, and step S88 of FIG. 4). Subsequent to step S20, the routine may move to step S24.

When the first response-processing device 32 is not performing the listen process (e.g., NO in step S14), in step S22, the specific processing device 38 may perform the AP search process for establishing a non-WFD network. Step S22 may be substantially the same as step S18 described above. As described above, when the non-WFD association instruction to start the AP search process is input when the listen process is not being executed (e.g., NO in step S14), the specific processing device 38 may perform the AP search process appropriately and may find the specific AP properly. Subsequent to step S22, the routine may move to step S24.

In step S24, the second connecting device 40 may display an AP list on the display device 14. The AP list may comprise information (e.g., an SSID) related to the one or more APs that have been found in step S18 or in step S22 of the AP search process. When no AP is found in the AP search process, the routine may skip step S24.

Subsequently, in step S26, the second connecting device 40 may monitor for a selection of an AP from among the one or more APs in the AP list displayed on the display device 14 and an input of a Personal Identification Number ("PIN") code for establishing a non-WFD connection with the selected AP. Through operation of the operating device 12, a desired AP may be selected from among the one or more APs in the AP list and a PIN code for establishing a non-WFD connection with the selected AP may be input. In response to such an operation, the second connecting device 40 may make a positive determination (YES) in step S26, and the routine may move to step S28. When the second connecting device 40 does not detect one or more of a selection of an AP and an input of a PIN code within a predetermined time period from a time when the AP list was displayed on the display device 14, the second connecting device 40 may make a negative determination (NO) in step S26 and the routine may return to step S14. Further, when no AP is found in the AP search process, the second connecting device 40 may also make a negative determination (NO) in step S26 and the routine may return to step S14.

The second connecting device 40 may perform communication for authentication with the selected AP, and subsequently, in step S28, the second connecting device 40 may determine whether the authentication succeeds. Hereinafter, it may be assumed, for example, that the selected AP may be the AP 60. In the communication performed in step S28, the second connecting device 40 may transmit data (e.g., an authentication method and an encryption method by using a PIN code, such as, for example, the PIN code inputted in step S26) to the AP 60. The authentication method and encryption method transmitted in step S28 may be input or predetermined. The AP 60 may perform authentication through the authentication method, the encryption method, and the PIN code. When the authentication succeeds, the AP 60 may transmit data representing the authentication success to the printer 10. Accordingly, the second connecting device 40 may make a positive determination (YES) in step S28. When the authentication succeeds (e.g., YES in step S28), a non-WFD connection may be established between the printer 10 and the AP 60. Subsequently, the non-WFD association process may end. When the authentication fails, the second connecting device 40 may make a negative determination (NO) in step S28, and the routine may return to step S14.

Figure 3:
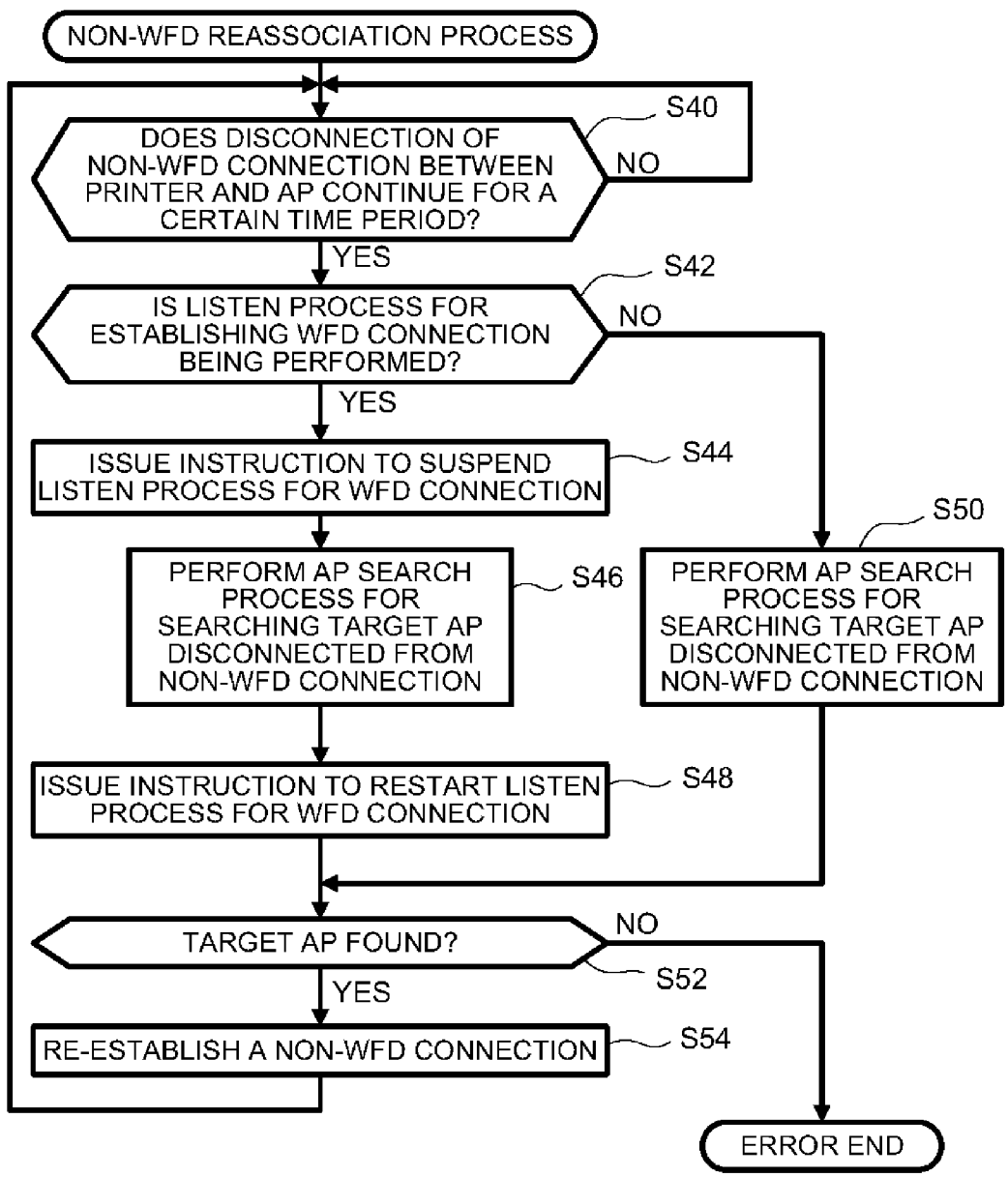
FIG. 3 is a flowchart showing a process of reassociating devices in a non-WFD network according to particular configurations.

With reference to FIG. 3, a non-WFD reassociation process performed by the printer 10 is now described. When the non-WFD connection between the printer 10 and the specific AP is established in the non-WFD association process in FIG. 2, the controller 26 may start the non-WFD reassociation process in FIG. 3. Hereinafter, it may be assumed, for example, that a non-WFD connection may have already been established between the printer 10 and the AP 60.

The printer 10 and the AP 60 may periodically perform presence confirmation therebetween. For example, when radio waves transmitted between the printer 10 and the AP 60 become weak or when the AP 60 is turned off, the second connecting device 40 may not be able to confirm the presence of the AP 60 when the second connecting device 40 performs the presence confirmation of the AP 60. When the second connecting device 40 is not able to confirm the presence of the AP 60 during the presence confirmation, the second connecting device 40 may determine that the non-WFD connection established between the printer 10 and the AP 60 is disconnected. In step S40, the second connecting device 40 may determine whether the disconnection of the non-WFD connection between the printer 10 and the AP 60 continues for a certain time period. When the second connecting device 40 makes a positive determination (YES) in step S40, the routine may move to step S42.

In step S42, the specific processing device 38 may determine whether the listen process for establishing a WFD network is being performed. Step S42 may be substantially the same as step S14 of FIG. 2. When the first response-processing device 32 is performing the listen process, the specific processing device 38 may make a positive determination (YES) in step S42, and the routine may move to step S44. When the first response-processing device 32 is not performing the listen process, the specific processing device 38 may make a negative determination (NO) in step S42, and the routine may move to step S50.

In step S44, the specific processing device 38 may instruct the first response-processing device 32 to suspend the listen process. In response to this, the first response-processing device 32 may suspend the listen process.

Subsequently, in step S46, the specific processing device 38 may perform the AP search process for searching a target AP (e.g., the AP 60, which has been disconnected from the non-WFD connection). More specifically, in step S46, the specific processing device 38 may transmit a specific search packet via wireless communication to APs that may be accessible by the printer 10. The specific search packet may comprise information (e.g., an SSID) related to the AP 60.

When the AP 60 has received the specific search packet from the printer 10, the AP 60 may transmit a response packet to the printer 10. By receiving the response packet from the AP 60, the specific processing device 38 may find the AP 60. When one or more APs other than the AP 60 receive the specific search packet from the printer 10, the one or more APs may not transmit response packets to the printer 10 because the specific search packet comprises the information related to the AP 60.

Subsequent to that, in step S48, the specific processing device 38 may instruct the first response-processing device 32 to restart the listen process. In response to the instruction to restart the listen process, the first response-processing device 32 may restart the listen process. Subsequent to step S48, the routine may move to step S52.

When the first response-processing device 32 is not performing the listen process (e.g., NO in step S42), in step S50, the specific processing device 38 may perform the AP search process for searching the AP 60. Step S50 may be substantially the same as step S46. Subsequent to step S50, the routine may move to step S52.

In step S52, the second connecting device 40 may determine whether the AP 60 has been found. More specifically, the second connecting device 40 may determine whether a response packet has been received from the AP 60. When a response packet has been received from the AP 60, the second connecting device 40 may make a positive determination (YES) in step S52, and the routine may move to step S54. When a response packet has not been received from the AP 60, the second connecting device 40 may make a negative determination (NO) in step S52. When the second connecting device 40 makes a negative determination (NO) in step S52, the non-WFD reassociation process may end due to an error.

In step S54, the second connecting device 40 may re-establish a non-WFD connection between the printer 10 and the AP 60. More specifically, the second connecting device 40 may re-perform communication for authentication (e.g., step S28 of FIG. 2) with the AP 60. When the authentication succeeds, a non-WFD connection may be re-established between the printer 10 and the AP 60. When the non-WFD connection is re-established between the printer 10 and the AP 60, the routine may return to step S40.

A WFD process performed by the printer 10 now is described with reference to FIG. 4.

At the time the printer 10 is turned on, the setting of the WFD I/F may be "off." An operation for changing the setting of the WFD I/F from "off" to "on" may be performed through operation of the operating device 12. When a change of the setting of the WFD from "off" to "on" is detected, the first response-processing device 32 may make a positive determination (YES) in step S70, and the routine may move to step S72. When the setting of the WFD I/F is changed to "on" (YES in step S70), an ability of the printer 10 to establish the WFD network may become enabled. Subsequently, in step S72, the first response-processing device 32 may start the listen process for establishing a WFD network. In the listen process, the first response-processing device 32 may monitor for reception of a probe request signal, via wireless communication, from an external device by using at least one (e.g., the channel 6) of the channels 1-13. When the first response-processing device 32 detects the reception of a probe request signal, via wireless communication, from the external device, the first response-processing device 32 may transmit a probe response signal, via wireless communication, to the external device. Subsequent to step S72, the controller 26 may perform processing of step S74, step S78, step S82, and step S90, as appropriate.

In step S74, the first connecting device 36 may monitor for reception of an association request signal, via wireless communication. The association request signal may comprise data in the physical layer of the OSI reference model, but the association request signal may not comprise data of layers (e.g., the network layer) higher than the physical layer in the OSI reference model. Upon receipt of the association request signal, the first connecting device 36 may make a positive determination (YES) in step S74, and the routine may move to step S76. In step S76, the first connecting device 36 may store information related to a sender of the association request signal in a predetermined storage area in the memory 30. More specifically, the association request signal may comprise a MAC address and an IP address of a device that is the sender of the association request signal. The first connecting device 36 may store such information (e.g., the MAC address and the IP address of a device that is the sender of the association request signal) in the predetermined storage area. Subsequent to step S76, the controller 26 may perform the step S74, step S78, step S82, and step S90 again, as appropriate.

In step S78, the first connecting device 36 may monitor for input of a WFD association instruction in the printer 10. For example, when establishment of a WFD connection between the printer 10 and the mobile terminal 80 is desired, a predetermined WFD association instruction may be input in the printer 10 by operating the operating device 12. When the first connecting device 36 detects the input of the predetermined WFD association instruction, the first connecting device 36 may make a positive determination (YES) in step S78, and the routine may move to step S80. In step S80, the controller 26 may perform a WFD association process (see FIG. 5). Subsequent to step S80, the controller 26 may perform the processing of step S74, step S78, step S82, and step S90 again, as appropriate.

In step S82, the first response-processing device 32 may monitor for an instruction to suspend the listen process from the specific processing device 38 (e.g., step S16 of FIG. 2 and step S44 of FIG. 3). When a positive determination (YES) is made in step S82, the routine may proceed to step S84, and the first response-processing device 32 may suspend the listen process. Consequently, the first response-processing device 32 may not transmit a probe response signal even though a probe request signal was received.

Subsequently, in step S86, the first response-processing device 32 may monitor for an instruction to restart the listen process from the specific processing device 38 (see, e.g., step S20 of FIG. 2 and step S48 of FIG. 3). When a positive determination (YES) is made in step S86, in step S88, the first response-processing device 32 may restart the listen process. Accordingly, for example, the external device (e.g., the mobile terminal 80) may receive a probe response signal from the printer 10 subsequent to transmitting a probe request signal to the printer 10. As a result of the communications, the external device may find the printer 10. Subsequent to step S88, the controller 26 may perform the processing of step S74, step S78, step S82, and step S90, as appropriate.

In step S90, the first response-processing device 32 may monitor for an operation of changing the setting of the WFD I/F from "on" to "off." When a positive determination (YES) is made in step S90, in step S92, the first response-processing device 32 may end the listen process. Subsequently, the printer 10 may not be set to any of the G/O status, the client status, and the device status for establishing the WFD network. Subsequent to step S92, the routine may return to step S70.

With reference to FIG. 5, the WFD association process in step S80 of FIG. 4 now is described. In step S100, the first connecting device 36 may determine whether the information has been stored in the predetermined storage area in the memory 30 in step S76 of FIG. 4. When the first connecting device 36 determines that the information has been stored in the predetermined storage area, this may indicate that an association request signal has been received from a device (e.g., the mobile terminal 80) that is requesting to establish a WFD connection with the printer 10 (hereinafter, referred to as a "target device"). When a positive determination (YES) is made in step S100, the first connecting device 36 may skip steps S102-S108, and the routine may move to step S110. When the information has not been stored in the predetermined storage area (e.g., NO in step S100), the routine may move to step S102.

In step S102, the controller 26 may perform a scan process, the listen process, and a search process. In some configurations, the controller 26 may not perform three processes simultaneously, and in certain configurations, the controller may not perform two processes simultaneously. Therefore, in such configurations, the controller 26 may perform one of the three processes and subsequently perform another of the three processes until the three processes are performed. Accordingly, in such configurations, the controller 26 may perform the scan process, the listen process, and the search process subsequent to one another, rather than simultaneously.

The scan process may be a process for searching for the presence of one or more G/O-status devices that are accessible by the printer 10. More specifically, in the scan process, the controller 26 may transmit a probe request signal, via wireless communication, by using the channels 1-13 sequentially. In particular configurations, only a WFD-enabled device may respond to the probe request signal transmitted from the printer 10 in the scan process. Therefore, for example, the AP 60 depicted in FIG. 1, which is a non-WFD-enabled device, may not transmit a probe response signal to the printer 10 in response to the probe request signal received from the printer 10.

The listen process performed in step S102 may be similar to the listen process performed in step S72 of FIG. 4. Accordingly, upon receipt of a probe request signal, via wireless communication, from a WFD-enabled device (hereinafter, referred to as a "specific device") set to the device status and being present in the area accessible by the printer 10, the first response-processing device 32 may transmit a probe response signal, via wireless communication, to the specific device. The probe response signal may comprise one or more of information indicating that the printer 10 is in the device status, a device name of the printer 10, information representing a mode of the printer 10, and a MAC address of the printer 10.

In the search process, the controller 26 may transmit a probe request signal via wireless communication sequentially by using, for example, the channels 1, 6, and 11 (e.g., of the channels 1-13) subsequent to one another. As a consequence of the transmission of the probe request signal, the controller 26 may receive a probe response signal, via wireless communication, from the specific device. The probe response signal may comprise one or more of information representing that the specific device is in the device status, a device name of the specific device, information representing a mode of the specific device, and a MAC address of the specific device. Thus, the controller 26 may find the specific device.

In step S104, the first connecting device 36 may determine whether an association request signal has been received from the target device via wireless communication during the execution of the processing in step S102. When an association request signal has been received from the target device via wireless communication during the execution of step S102 (e.g., YES in step S104), the routine may skip step S106 and step S108 and move to step S110. When an association request signal has not been received from the target device (NO in step S104), the routine may move to step S106.

In step S106, the first connecting device 36 may display a device list on the display device 14. Accordingly, the first connecting device 36 may display, on the display device 14, the information obtained through the scan process and the search process performed in step S102. Subsequently, circumstances surrounding the printer 10 may be determined by browsing the device list, which ma comprise information that one or more devices are present in the area accessible by the printer 10. Further, a device selecting operation for selecting a device with which the printer 10 may establish a wireless connection (e.g., an operation for selecting a target device, such as, for example, the mobile terminal 80) may be performed through the operating device 12. When the device selecting operation has been performed, the controller 26 may make a positive determination (YES) in step S108. Subsequent to selecting the target device, a PIN code displayed on one of the printer 10 and the target device may be input into the other of the printer 10 and the target device.

In step S110, the first connecting device 36 may determine whether the printer 10 and the target device are currently both set to the device status. When a positive determination (YES) is made in step S110 (e.g., when the printer 10 and the target device are both in the device status), the routine may move to step S112.

The target device may be specified as described below. When an association request signal has been received (e.g., YES in step S74 of FIG. 4 and YES in step S100 of FIG. 5, or NO in step S100 of FIG. 5 and YES in step S104), a device that is the sender of the association request signal may be specified as the target device. When an association request signal has not been received (e.g., NO in step S100 and NO in step S104 of FIG. 5), a device selected by the user in the device list displayed in step S106 (e.g., in step S108) may be specified as the target device.

In step S112, the status determination processing device 34 may perform a G/O negotiation between the printer 10 and the target device. As described above, in a single wireless network according to particular configurations, only one G/O-status device may be present. Therefore, the status determination processing device 34 may assign, through the G/O negotiation, one of the printer 10 and the target device as a group owner and the other of the printer 10 and the target device as a client.

In step S112, the status determination processing device 34 may transmit an association request signal, via wireless communication, to the target device and may subsequently receive an OK signal, via wireless communication, from the target device. Subsequently, the status determination processing device 34 may receive information indicating a G/O priority assigned to the target device, via wireless communication, from the target device while transmitting information representing a G/O priority assigned to the printer 10, via wireless communication, to the target device. The G/O priority assigned to the printer 10 may be an indicator that may represent priority for assigning a group owner to the printer 10 and may be predetermined in the printer 10. Similar to this, the G/O priority assigned to the target device may be an indicator that may represent priority for assigning a group owner to the target device and may be predetermined in the target device. For example, a device (e.g., a PC) equipped with a relatively-high performance CPU and memory may be able to perform other processing in high speed while operating as a group owner. Therefore, the G/O priority generally may be determined such that such a device with a relatively-high performance CPU and memory may have a higher priority for serving as a group owner. Conversely, for example, a device equipped with a relatively-low performance CPU and memory might not perform other processing in high speed while operating as a group owner. Therefore, the G/O priority generally may be determined such that such a device with a relatively-low performance CPU and memory may have a lower priority for serving as a group owner.

The status determination processing device 34 may compare the G/O priority assigned to the printer 10 and the G/O priority assigned to the target device. As a result of the comparison, the status determination processing device 34 may determine that the device having higher priority (e.g., one of the printer 10 and the target device) may serve as a group owner and the device having lower priority (e.g., the other of the printer 10 and the target device) may serve as a client. The target device may also determine roles of the printer 10 and the target device (e.g., between a group owner and a client) based on the G/O priorities assigned to the printer 10 and the target device, respectively, in the same manner as that adopted by the printer 10. Subsequent to the G/O negotiation in step S112, the routine may move to step S114.

Subsequent to the G/O negotiation in step S112, the printer 10 may shift to the determined status (e.g., one of the G/O status and the client status) from the device status. The target device may also shift to the determined status (e.g., one of the G/O status and the client status) from the device status.

When it is determined that the current status of the target device is the G/O status in step S110 (NO in step S110), the printer 10 may shift to the client status from the device status without performing the G/O negotiation in step S112. As described above, in particular configurations, one G/O-status device may be present in a single wireless network. Therefore, the printer 10 may not have the G/O status in the single wireless network. When it is determined that the current status of the printer 10 is the G/O status in step S110 (e.g., NO in step S110), the current status of the printer 10 may be maintained as the G/O status without performing the G/O negotiation in step S112. Consequently, the target device may shift to the client status from the device status. When a negative determination (NO) is made in step S110, the routine may move to step S114. The negative determination (NO) may be made in step S110 when the G/O status is assigned to one of the printer 10 and the target device through the previous G/O negotiation (e.g., step S112) as well as when the G/O status is assigned to one of the printer 10 and the target device by changing the setting of the autonomous G/O mode (described below) from "off" to "on."

In step S114, the first connecting device 36 may determine whether the current status of the printer 10 is the G/O status and whether the current status of the target device is the client status. When a positive determination (YES) is made in step S114 (e.g., when the current status of the printer 10 is the G/O status and the current status of the target device is the client status), the routine may move to step S116. When a negative determination (NO) is made in step S114 (e.g., when the current status of the printer 10 is the client status and the current status of the target device is the G/O status), the routine may move to step S118.

In step S116, the first connecting device 36 may perform a Wi-Fi Protected Setup ("WPS") negotiation for G/O status. Accordingly, the first connecting device 36 may transmit the information (e.g., the SSID, the authentication method, and the encryption method) for establishing a wireless connection to the target device via wireless communication by using the PIN code. The first connecting device 36 may perform various authentication processes between the printer 10 and the target device by using the information. When the authentication succeeds, a wireless connection may be established between the printer 10 and the target device. When the authentication fails, a wireless connection may not be established between the printer 10 and the target device and the WFD association process may end.

When the wireless connection is established in step S116, the controller 26 may further add the MAC address of the target device in the management list. With the addition of the MAC address of the target device in the management list, the printer 10 having the G/O status may perform data communications (e.g., one or more of transmission and reception of communication target data, such as, for example, print data) with the target device having the client status. Further, the printer 10 having the G/O status may relay wireless communication between the target device having the client status and another device listed in the management list of the printer 10.

In step S118, the first connecting device 36 may perform a WPS negotiation for client status. Accordingly, the first connecting device 36 may receive the information (e.g., the SSID, the authentication method, and the encryption method) for establishing a wireless connection from the target device via wireless communication by using the PIN code. The first connecting device 36 may perform various authentication processes between the printer 10 and the target device by using the information. When the authentication succeeds, a wireless connection may be established between the printer 10 and the target device. Thus, the printer 10 having the client status may perform wireless communication (e.g., transmission or reception of target data, such as, for example, print data) with the target device having the G/O status. Further, the printer 10 having the client status may perform wireless communication (e.g., transmission or reception of target data) with another device (e.g., another device listed in the management list of the target device) via the target device having the G/O status. Subsequent to step S116 or step S118, the WFD association process in FIG. 5 may end.

Although not depicted in flowcharts of FIGS. 4 and 5 an operation for changing the setting of the autonomous G/O mode from "off" to "on" may be performed through operation of the operating device 12. When the setting of the autonomous G/O mode is changed to "on," the controller 26 may change the current status of the printer 10 to the G/O status without performing the G/O negotiation. Thereafter, the controller 26 may maintain the printer 10 in the G/O status until the setting of the autonomous G/O mode is changed to "off."

Although not depicted in the flowcharts of FIGS. 4 and 5, when the printer 10 is assigned as the group owner in step S112 of FIG. 5 or when the printer 10 is assigned as the group owner by which the setting of the autonomous G/O mode is changed to "on," the second response-processing device 42 may start a monitor process for establishing a WFD network via the second BSS processing device 24. The monitor process may be similar to the listen process described above; however, the monitor process may be different from the above-described listen process in that the monitor process may be performed via the second BSS processing device 24. Accordingly, in the monitor process, the second response-processing device 42 may transmit a probe response signal to the external device in response to a probe request signal received from the external device. Thus, the external device may find the printer 10 having the G/O status appropriately.

As described above, the controller 26 may perform the process performed via, the first BSS processing device 22 and the process performed via the second BSS processing device 24 simultaneously. Therefore, while the second response-processing device 42 may perform the monitor process via the second BSS processing device 24, the specific processing device 38 may perform the AP search process via the first BSS processing device 22 or perform wireless communication (e.g., transmission or reception of communication target data) by using the established non-WFD network.

As a result of the performance of the monitor process by the second response-processing device 42, the external device (e.g., the mobile terminal 90) may find the printer 10. In the monitor process, the external device may transmit an association request signal to the printer 10. Upon receipt of the association request signal via the second BBS processing device 24, the first connecting device 36 may make a positive determination (YES) in step S74 of FIG. 4, and in step S76, may store information related to the external device (e.g., the mobile terminal 90), which is the sender of the association request signal, in the predetermined storage area in the memory 30. Subsequently, when a WFD association instruction is input, the first connecting device 36 may make a positive determination (YES) in step S78. Subsequently, in step S116 of FIG. 5, the first connecting device 36 may perform the WPS negotiation for G/O status (e.g., between the printer 10 and the external device) and may establish a WFD connection between the printer 10 and the external device. At that time, the information (e.g., the SSID) used in the authentication between the printer 10 and another device may be substantially the same as the information used in the WPS negotiation for G/O status in step S116. The second BBS processing device 24 may be used for the above communication between the printer 10 and the other device.

Subsequently, with reference to FIGS. 6-9, the processing performed by each device 10, 60, 80 and 90 in various example cases are described. In FIGS. 6-9, a "first BSS" may represent that the printer 10 performs processing via the first BSS processing device 22, and a "second BSS" may represent that the printer 10 performs processing via the second BSS processing device 24.

In Case A shown in FIG. 6, the setting of the WFD I/F of the printer 10 may be changed from "off" to "on" initially, and, subsequently, a non-WFD association instruction may be input. In Case A, a non-WFD connection may be established between the printer 10 and the AP 60, and, subsequently, a WFD connection may be established between the printer 10 and the mobile terminal 80.

When the operation for changing the setting of the WFD I/F from the "off" to "on" is performed (e.g., YES in step S70 of FIG. 4), the status of the printer 10 may become the device status. Subsequently, the printer 10 having the device status may start the listen process (e.g., step S72 of FIG. 4). With this configuration, the printer 10 according to particular configurations may perform the listen process appropriately in accordance with the operation. Subsequently, when a non-WFD association instruction is input in the printer 10 (e.g., YES in step S10 of FIG. 2), the printer 10 may suspend the listen process and start the AP search process (e.g., YES in step S14, step S16, and step S18 of FIG. 2, and step S84 of FIG. 4). Consequently, when a condition for establishing a non-WFD connection between the printer 10 and the AP 60 (e.g., an input of a non-WFD association instruction) is satisfied, the printer 10 may, for example, appropriately perform only the AP search process from among the listen process and the AP search process.

Upon receipt of a search packet from the printer 10, via wireless communication, the AP 60 may transmit a response packet via wireless communication to the printer 10. Subsequently, the printer 10 may receive the response packet via wireless communication. Subsequent to that, the printer 10 may restart the listen process (e.g., step S20 of FIG. 2 and step S88 of FIG. 4). Therefore, the printer 10 according to particular configurations may continue the listen process appropriately. Subsequently, the printer 10 may display the AP list on the display device 14 (e.g., step S24 of FIG. 2).

In Case A shown in FIG. 6, an AP may not be selected from the AP list within the predetermined time period (e.g., NO in step S26 of FIG. 2). Therefore, the printer 10 may suspend the listen process again and may perform the AP search process again (e.g. YES in step S14 of FIG. 2, step S16 and step S18 of FIG. 2, and step S84 of FIG. 4). Subsequently, the printer 10 may receive a response packet, via wireless communication, from the AP 60 and may restart the listen process (e.g., step S20 of FIG. 2 and step S88 of FIG. 4). The printer 10 may display the AP list on the display device 14 again (e.g., step S24 of FIG. 2). As described above, when the non-WFD association instruction is input, the printer may perform the AP search process repeatedly. Thus, the printer 10 may find the AP 60 appropriately, and, therefore, a non-WFD connection may be established appropriately between the printer 10 and the AP 60.

Subsequently one AP (e.g., the AP 60) may be selected from the AP list displayed again. When the AP 60 is selected from the AP list, the printer 10 may perform communication for authentication between the printer 10 and the AP 60 (e.g., step S28 of FIG. 2). With this communication, a non-WFD connection may be established between the printer 10 and the AP 60. While the non-WFD connection is established between the printer 10 and the AP 60, the printer 10 may continue the listen process.

Subsequently, when the mobile terminal 80 having the device status performs the search process, the printer 10 may receive a probe request signal via wireless communication from the mobile terminal 80. Upon receipt of the probe request signal from the mobile terminal 80, via wireless communication, the printer 10 may transmit a probe response signal, via wireless communication, to mobile terminal 80 when the printer 10 is performing the listen process. Upon receipt of the probe response signal, a device list comprising information representing the printer 10 may be displayed on a display device of the mobile terminal 80. When the user of the mobile terminal 80 selects one printer (e.g., the printer 10) from the device list, the mobile terminal 80 may transmit an association request signal via wireless communication to the printer 10. Upon receipt of the association request signal from the mobile terminal 80 via wireless communication, the printer 10 may store information related to the mobile terminal 80 in the predetermined area in the memory 30 (e.g., YES in step S74 and step S76 of FIG. 4).

Subsequently, in response to a WFD association instruction input into the printer 10 (e.g., YES in step S78 of FIG. 4), the printer 10 may perform a G/O negotiation between the printer 10 and the mobile terminal 80 (e.g., YES in step S100 and YES in step S110 of FIG. 5). Accordingly, as a result of the G/O negotiation, it may be determined that the printer 10 operates in the G/O status and that the mobile terminal 80 operates in the client status. Consequently, the printer 10 may change its status from the device status to the G/O status. At the same time, the mobile terminal 80 may change its status from the device status to the client status.

Subsequent to determining that the printer 10 operates in the G/O status, the printer 10 may start the monitor process via the second BSS processing device 24. Subsequently, the printer 10 may perform a WPS negotiation for determining a G/O status thereof (e.g., step S116 of FIG. 5). Consequently, a WFD connection may be established between the printer 10 and the mobile terminal 80.

In Case B shown in FIGS. 7 and 8, a WFD connection may be established between the printer 10 and the mobile terminal 80 prior to an establishment of a non-WFD connection in accordance with a WFD association instruction input prior to an input of a non-WFD association instruction. Accordingly, in Case B, a non-WFD connection may be established between the printer 10 and the AP 60 subsequent to a WFD connection established between the printer 10 and the mobile terminal 80. Subsequently, a WFD connection may be established between the printer 10 and the mobile terminal 90.

When an operation for changing the setting of the WFD from "off" to "on" is performed (e.g., YES in step S70 of FIG. 4), the status of the printer 10 may become the device status. Subsequently, the printer 10 with the device status may start the listen process (e.g., step S72 of FIG. 4). Subsequent to that, in response to an input of a WFD association instruction (e.g., YES in step S78 of FIG. 4), the printer 10 may perform the scan process, the listen process, and the search process sequentially (e.g., NO in step S100, and step S102 of FIG. 5). During the execution of the search process, when the printer 10 transmits a probe request signal, via wireless communication, to the mobile terminal 80, the printer 10 may receive a probe response signal, via wireless communication, from the mobile terminal 80, which may have the device status. Similarly, during the execution of the search process, when the printer transmits a probe request signal via wireless communication to the mobile terminal 90, the printer 10 may receive a probe response signal, via wireless communication, from the mobile terminal 90 having the device status.

Subsequent to completing the scan process, the listen process, and the search process, the printer 10 may display the device list on the display device 14 (e.g., step S106 of FIG. 5). The device list may comprise information related to the mobile terminals 80 and 90. In Case B, the mobile terminal 80 may be from the device list (e.g., YES in step S108 of FIG. 5). Subsequently, the printer 10 may perform a G/O negotiation between the printer 10 and the mobile terminal 80 (e.g., YES in step S110, and step S112). In Case B, as a result of the G/O negotiation, it may be determined that the printer 10 operates in the G/O status and the mobile terminal 80 operates in the client status.

Similar to the Case A (sec FIG. 6), when it is determined that the printer 10 operates in the G/O status, the printer 10 may start the monitor process via the second BSS processing device 24. Subsequently, the printer 10 may perform a WPS negotiation for G/O status and may establish a WFD connection between the printer 10 and the mobile terminal 80 (e.g., step S116 of FIG. 5).

Subsequently, in Case B, as depicted in FIG. 8, while the printer 10 is performing the monitor process, a non-WFD association instruction may be input in the printer 10. Consequently, the printer 10 may perform the AP search process via the first BSS processing device 22 without suspending the monitor process (e.g., YES in step S10, NO in step S14, and step S22 of FIG. 2). As described above, the printer 10 may appropriately perform the AP search process simultaneously with the monitor process when a non-WFD association instruction is input during the execution of the monitor process.

Subsequently, the printer 10 may receive a response packet, via wireless communication, from the AP 60. Subsequent to that, the printer 10 may display the AP list comprising information (e.g., the SSID) about the AP 60 on the display device 14 (e.g., step S24 of FIG. 2).

The AP 60 may be selected from the AP list. In response to selecting the AP 60 from the AP list, the printer 10 may perform communication for authentication between the printer 10 and the AP 60 (e.g., step S28 of FIG. 2). Thus, a non-WFD connection may be established between the printer 10 and the AP 60. Consequently, while the WFD connection is established between the printer 10 and the mobile terminal 80, the non-WFD connection may be established between the printer 10 and the AP 60.

The printer 10 may continue the monitor process subsequent to determining that the printer 10 operates in the G/O status. Therefore, when the printer 10 having the G/O status receives a probe request signal, via wireless communication, from the mobile terminal 90 having the device status and performing the scan process, the printer 10 may transmit a probe response signal, via wireless communication, to the mobile terminal 90. Consequently, the device list comprising the information representing the printer 10 having the G/O status may be displayed on the display device of the mobile terminal 90. When the mobile terminal 90 is operated to select the printer 10 from the device list, the mobile terminal 90 may transmit an association request signal, via wireless communication, to the printer 10 and may change its status from the device status to the client status. Upon receipt of the association request signal from the mobile terminal 90, via wireless communication, the printer 10 may store the information related to the mobile terminal 90 in the predetermined storage area in the memory 30 (e.g., YES in step S74, and step S76 of FIG. 4). Subsequently, when a WFD association instruction is input in the printer 10 (e.g., YES in step S78 of FIG. 4), the printer 10 may perform a WPS negotiation for G/O status between the printer 10 and the mobile terminal 90 to establish a WFD connection between the printer 10 and the mobile terminal 90 (e.g., step S116 of FIG. 5). Consequently, the mobile terminal 90 may newly participate in the WFD network established between the printer 10 and the mobile terminal 80.

In Case C depicted in FIG. 9, a non-WFD connection may be established between the printer 10 and the AP 60, and, subsequently, the non-WFD connection may be disconnected in accordance with the change of the setting for the WFD I/F from "off" to "on."

In Case C, the non-WFD connection may be established between the printer 10 and the AP 60. Consequently, when an operation for changing the setting of the WFD I/F from "off" to "on" is performed (e.g., YES in step S70 of FIG. 4), the printer 10 may start the listen process (e.g., step S72 of FIG. 4).

Subsequently, when a certain time period has elapsed since the non-WFD connection was disconnected between the printer 10 and the AP 60 (e.g., YES in step S40 of FIG. 3), the printer 10 may suspend the listen process and start the AP search process for searching the AP 60 (e.g., YES in step S42, and steps Step S44 and Step S46 of FIG. 3, and Step S84 of FIG. 4).

Upon receipt of a search packet from the printer 10, via wireless communication, the AP 60 may transmit a response packet to the printer 10. Thus, the printer 10 may find the AP 60. Subsequently, the printer 10 may restart the listen process (e.g., step S48 of FIG. 3 and step S88 of FIG. 4). Subsequent to that, the printer 10 may establish the non-WFD connection between the printer 10 and the AP 60 again (e.g., step S54 of FIG. 4) while continuing the listen process. Therefore, upon receipt of a probe request signal from the mobile terminal 80 having the device status, via wireless communication, the printer 10 having the device status may transmit a probe response signal, via wireless communication, to the mobile terminal 80.

As described above, the printer 10 according to particular configurations may be configured not to perform the listen process and the AP search process simultaneously via the single BSS processing device (e.g., the first BSS processing device 22). In particular configurations, as depicted in Case A in FIG. 6, when a non-WFD association instruction is input while the listen process is being performed (e.g., YES in step S10 of FIG. 2), the printer 10 may suspend the listen process and perform the AP search process (e.g., YES in step S14 of FIG. 2, and steps Step S16, Step S18, and Step S84 of FIG. 4). Consequently, the printer 10 may find the AP 60 appropriately. Accordingly, the non-WFD connection may be appropriately established between the printer 10 and the AP 60. Subsequent to completing the AP search process, the printer 10 may restart the listen process (e.g., step S20 of FIG. 2 and step S88 of FIG. 4). Thus, the mobile terminal 80 may find the printer 10 appropriately. Therefore, the WFD connection may be appropriately established between the printer 10 and the mobile terminal 80.

Various configurations of the disclosure have been described above; however, such configurations are only examples and do not limit the scope of the appended claims. Examples of the modification and alternations of the above-described configurations are described below.

In certain configurations, for example, instead of the AP search process, the specific processing device 38 may be configured to perform a beacon receiving process for receiving a beacon signal that may be periodically transmitted from each AP that may be accessible by the printer 10. The beacon signal may comprise information (e.g., SSID) about the AP. The specific processing device 38 may find the AP 60 by receiving the beacon signal.

In certain configurations, for example, when the operation for changing the setting of the WFD I/F to "on" is performed to start the listen process during the execution of the AP search process (e.g., YES in step S70 of FIG. 4), the first response-processing device 32 and the specific processing device 38 may be configured to suspend the AP search process and perform the listen process or configured to perform AP search process without performing the listen process. When a non-WFD association instruction is input to start the AP search process during the execution of the listen process (e.g., YES in step S10 of FIG. 2), the first response-processing device 32 and the specific processing device 38 may be configured to perform the listen process without starting the AP search process. Generally, when one of the first and second conditions is satisfied and one of the first response process and the specific process is being performed, a first response-processing device and a specific processing device may be configured to perform one of the first response process and the specific process.

In certain configurations, for example, when an instruction to start the listen process is provided by another device (e.g., the mobile terminal 80), the first response-processing device 32 may be configured to perform the listen process. Accordingly, the provision of the instruction to start the listen process from the other device may be an example of the first condition. Further, the first response-processing device 32 may be configured to perform the listen process when a predetermined time has elapsed. Accordingly, the coming of the predetermined timing may be an example of the first condition. Further, the printer 10 may have a web server function, for example. Consequently, the specific processing device 38 may be configured to perform the AP search process when an instruction to start the AP search process is provided, via a web server of the printer 10, from another device (e.g., the PC 70). Accordingly, the provision of the instruction to start the AP search process by the other device may be an example of the second condition. The specific processing device 38 may be configured to perform the AP search process when a predetermined time has elapsed, for example. Accordingly, the elapse of the predetermined time may be an example of the second condition.

In certain configurations, for example, the wireless communication device may not be limited to the printer 10 but may comprise or correspond to other devices that may perform wireless communication (e.g., mobile terminals, personal computers, servers, facsimile machines, copying machines, scanners, or multifunction peripheral devices). Further, the first device, the second device, and the third device may not be limited to the mobile terminal 80, the AP 60, and the mobile terminal 90 but may comprise or correspond to other devices that may perform wireless communication (e.g., personal computers, servers, printers, facsimile machines, copying machines, scanners, or multifunction peripheral devices).

In certain configurations, for example, while the first response-processing device 32 is performing the listen process or while the specific processing device 38 is performing the AP search process, the wireless communication device may be configured to perform another process other than the listen process and the AP search process simultaneously with one of the listen process and the AP search process. Generally, the first response-processing device and the specific processing device may be configured to perform one of the first response process and the specific process. Accordingly, the first response-processing device and the specific processing device may be configured not to perform the first response process and the specific process simultaneously (e.g., the first response-processing device and the specific processing device may be configured to perform one of the first response process and the specific process selectively). Nevertheless, simultaneous performance of another process and one of the first response process and the specific process by the wireless communication device may still occur.

In the above-described configurations, the devices 32, 34, 36, 38, 40, and 42 may be implemented by the CPU 28 of the printer 10 in accordance with the computer-readable instructions. Nevertheless, in other configurations, for example, one or more of the devices 32, 34, 36, 38, 40, and 42 may be implemented by hardware, such as, for example, a logical circuit (e.g., an application specific integrated circuit).

Further, the technical elements disclosed herein and the drawings may operate alone or in various combinations, and may not be limited to those configurations in the claims at the time of the initial disclosure. Furthermore, the techniques described as examples in the specification or drawings may achieve a plurality of objectives simultaneously and may provide technical utility by achieving one or more of these or other objectives.

While the invention has been described in connection with various exemplary structures and illustrative configurations, it will be understood by those skilled in the art that other variations and modifications of the structures, configurations, and configurations disclosed above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other configurations comprising other possible combinations. Other structures, configurations, and configurations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A wireless communication device configured to operate selectively in one of a plurality of statuses comprising a master-station status for serving as a master station of a wireless network and a slave-station status for serving as a slave station of the wireless network, the wireless communication device comprising:
 a processor; and
 a memory storing computer-readable instructions therein, the computer-readable instructions, when executed by the processor, instructing the wireless communication device to:
  perform a first process for establishing a first-type connection with a first device in response to satisfaction of a first condition, the first process comprising:
   performing a first response process comprising:
    receiving from the first device a search signal, and
    transmitting to the first device a response signal in response to the search signal;
   performing a determining process in response to performance of the first response process, the determining process comprising:
    assigning one of the master-station status and the slave-station status to the wireless communication device; and
    establishing the first-type connection with the first device, in which the wireless communication device is configured to operate as one of the master station and the slave station in accordance with the one of the master-station status and the slave-station status assigned to the wireless communication device in the determining process;
  perform a second process for establishing a second-type connection with a second device in response to satisfaction of a second condition, the second process comprising:
   performing a detecting process of detecting the second device; and
   establishing the second-type connection with the second device in response to performance of the detecting process,
  wherein one of a first action and a second action is performed in response to one of the following:
   the first condition is satisfied while the detecting process is being performed, and
   the second condition is satisfied while the first response process is being performed,
  wherein the first action includes performing the first response process of the first process without performing the detecting process, and
  wherein the second action includes performing the detecting process of the second process without performing the first response process.

2. The wireless communication device according to claim 1,
 wherein the first action includes performing the first response process of the first process and prohibiting the detecting process, and
 wherein the second action includes performing the detecting process of the second process and prohibiting the first response process.

3. The wireless communication device according to claim 2,
 wherein the first action is performed in response to the first condition being satisfied while the detecting process is being performed, and
 wherein the second action is performed in response to the second condition being satisfied while the first response process is being performed.

4. The wireless communication device according to claim 1, wherein the detecting process further comprises:
 transmitting another search signal for the second device; and
 receiving another response signal from the second device in response to the other search signal.

5. The wireless communication device according to claim 1, wherein the first response process is suspended and the detecting process of the second process is started in response to satisfaction of the second condition while the first response process is being performed.

6. The wireless communication device according to claim 5, wherein the first response process of the first process is restarted in response to completion of the detecting process subsequent to suspending the first response process.

7. The wireless communication device according to claim 1, wherein the detecting process is suspended and the first response process of the first process is started in response to satisfaction of the first condition while the detecting process is being performed.

8. The wireless communication device according to claim 1, wherein the detecting process is attempted until the second-type connection is established.

9. The wireless communication device according to claim 1, wherein the detecting process is started and stopped repeatedly until the second-type connection is established.

10. The wireless communication device according to claim 1,
 wherein the first condition is satisfied when an operation for changing a first setting of the wireless communication device to a second setting of the wireless communication device is performed,
 wherein the wireless communication device is configured to operate in a status other than the master-station status and the slave-station status in response to being set to the first setting, and
 wherein the wireless communication device is configured to operate in the one of the plurality of statuses in response to being set to the second setting.

11. The wireless communication device according to claim 10,
 wherein the wireless communication device is further configured to prohibit receipt of the search signal in response to being set to the first setting, and
 wherein the wireless communication device is further configured to receive the search signal in response to being set to the second setting.

12. The wireless communication device according to claim 1, wherein the second condition is satisfied when an operation for changing from a first state in which the second-type connection is established with the second device to a second state in which the second-type connection is disconnected from the second device.

13. The wireless communication device according to claim 1, wherein the second condition is satisfied when an operation for initiating the second process is performed.

14. The wireless communication device according to claim 1,
  wherein the detecting process of the second process is performed in response to the second condition being satisfied while the first response process is not being performed and a third condition is satisfied, and
  wherein the third condition is satisfied when the first-type connection is not established with the first device while the wireless communication device is operating in the master-station status.

15. The wireless communication device according to claim 1,
  wherein the detecting process of the second process is performed in response to the second condition being satisfied while the first response process is not being performed and a third condition is satisfied, and
  wherein the third condition is satisfied when the first-type connection is currently established with the first device.

16. The wireless communication device according to claim 1,
  wherein the first response process is stopped in response to completion of the determining process, and
  wherein the computer-readable instructions, when executed by the processor, further instruct the wireless communication device to:
    perform a second response process, which is different from the first response process, in response to assigning, during the determining process, the master-station status to the wireless communication device,
  wherein the second response process comprises:
    receiving the search signal from a third device; and
    transmitting the response signal to the third device in response to the search signal.

17. The wireless communication device according to claim 16,
  wherein the second response process is performed continuously, and
  wherein the detecting process of the second process is initiated in response to satisfaction of the second condition while the second response process is being performed.

18. The wireless communication device according to claim 16, wherein the second response process is performed while the wireless communication device is operating in the master-station status.

19. The wireless communication device according to claim 16,
  wherein the first-type connection is a Wi-Fi Direct ("WFD") connection, and
  wherein the second-type connection is a non-WFD connection.

20. A communication system comprising:
  a first device;
  a second device; and
  a wireless communication device, the wireless communication device configured to operate selectively in one of a plurality of statuses comprising a master-station status for serving as a master station of a wireless network and a slave-station status for serving as a slave station of the wireless network, the wireless communication device comprising:
    a processor; and
    a memory storing computer-readable instructions therein, the computer-readable instructions, when executed by the processor, instructing the wireless communication device to:
      perform a first process for establishing a first-type connection with the first device in response to satisfaction of a first condition, the first process comprising:
        performing a response process comprising:
          receiving from the first device a search signal, and
          transmitting to the first device a response signal in response to the search signal;
        performing a determining process in response to performance of the response process, the determining process comprising:
          assigning one of the master-station status and the slave-station status to the wireless communication device; and
          establishing the first-type connection with the first device, in which the wireless communication device is configured to operate as one of the master station and the slave station in accordance with the one of the master-station status and the slave-station status assigned to the wireless communication device in the determining process;
      perform a second process for establishing a second-type connection with the second device in response to satisfaction of a second condition, the second process comprising:
        performing a detecting process of detecting the second device; and
        establishing the second-type connection with the second device in response to performance of the detecting process,
      wherein one of a first action and a second action is performed in response to one of the following:
        the first condition is satisfied while the detecting process is being performed, and
        the second condition is satisfied while the first response process is being performed,
      wherein the first action includes performing the first response process of the first process without performing the detecting process, and
      wherein the second action includes performing the detecting process of the second process without performing the first response process.

21. A wireless communication device configured to operate selectively in one of a plurality of statuses comprising a master-station status for serving as a master station of a wireless network, the wireless communication device comprising:
  a processor; and
  a memory storing computer-readable instructions therein, the computer-readable instructions, when executed by the processor, instructing the wireless communication device to:
    perform a first process for establishing a first-type connection with a first device in response to satisfaction of a first condition, the first process comprising:
      performing a first response process comprising:
        receiving from the first device a search signal, and
        transmitting to the first device a response signal in response to the search signal;
      establishing the first-type connection with the first device, in which the wireless communication device is configured to operate as the master station, in response to performance of the first response process;

perform a second process for establishing a second-type connection with a second device in response to satisfaction of a second condition, the second process comprising:
performing a detecting process of detecting the second device; and
establishing the second-type connection with the second device in response to performance of the detecting process,
wherein one of a first action and a second action is performed in response to one of the following:
the first condition is satisfied while the detecting process is being performed, and
the second condition is satisfied while the first response process is being performed,
wherein the first action includes performing the first response process of the first process without performing the detecting process, and
wherein the second action includes performing the detecting process of the second process without performing the first response process.

* * * * *